Patented July 15, 1952

2,603,615

UNITED STATES PATENT OFFICE 2,603,615

VINYL CHLORIDE RESINS PLASTICIZED WITH ESTERS OF PHENYL PHENOXY ACETIC ACID

Joachim Dazzi, Dayton, Ohio, assignor to Monsanto Chemical Company, St. Louis, Mo., a corporation of Delaware No Drawing. Application June 24, 1949, Serial No. 101,249

10 Claims. (Cl. 260—30.8)

This invention relates to new resinous compositions having utility over widely varying conditions. More particularly the invention relates to the use of esters of phenylphenoxyacetic acid as plasticizers for vinyl chloride resins.

The primary purpose of this invention is to provide improved plasticizers for vinyl chloride resins. A further purpose of this invention is to provide new resinous compositions having desirable flexibility over wide temperature ranges. A still further purpose of this invention is to provide inexpensive resinous compositions which retain their plastic properties after subjection to elevated temperatures and long periods of time.

It has been found that esters of phenylphenoxyacetic acid having the following structural formula are efficient plasticizers for vinyl chloride polymers.

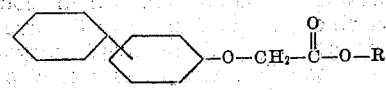

wherein R is an aliphatic radical of the group consisting of hydrocarbon, thiahydrocarbon and oxahydrocarbon radicals having a total of from four to twelve carbon, oxygen and sulfur atoms. The new plasticizers may be esters of the ortho-, meta, and para-phenylphenoxyacetic acids and various aliphatic alcohols, such as n-butyl alcohol, t-butanol, n-hexanol, the amyl alcohols, 2-ethylhexyl alcohol, the nonyl alcohols and other aliphatic straight and branched chain alcohols having up to twelve carbon atoms, the oxahydrocarbon alcohols, such as ethyl cellosolve, butyl cellosolve, 2-ethylhexoxy ethyl alcohol, carbitol (diethylene glycol ethyl ether), butyl carbitol and other aliphatic alcohols in which CH2 groups have been replaced by either oxygen atoms, the thia alcohols, such as 3-thia-n-pentanol, 3,6-dithiaoctyl alcohol, and other aliphatic alcohols wherein one or more CH2 groups have been replaced by divalent sulfur atoms. In all cases the R radicals must have a total of from four to twelve carbon, oxygen and sulfur atoms in the molecule.

The following specific compounds are included within the scope of the claims.

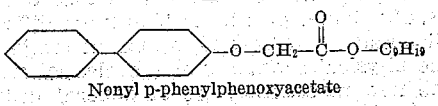
Nonyl p-phenylphenoxyacetate

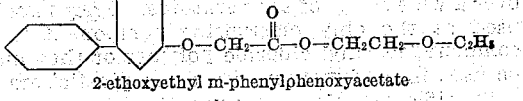
2-ethoxyethyl m-phenylphenoxyacetate

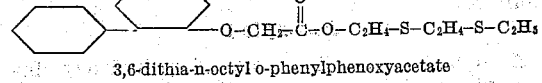
3,6-dithia-n-octyl o-phenylphenoxyacetate

The plasticizers are made by the esterification of phenylphenoxyacetic acid, which may be prepared by reaction of a hydroxy biphenyl and chloracetic acid in the presence of sodium hydroxide, the acid being separated from the aqueous solution by addition of a strong acid, for example hydrochloric acid. The esterifications are preferably effected by refluxing the acid and the desired alcohol of the type above described, in the presence of a catalyst as desired, and continuously separating the evolved water by means of a continuous separatory trap. The esters may be purified by distillation in vacuum.

The new compounds are valuable plasticizers for polyvinyl chloride and copolymers of more than 70 percent of vinyl chloride and up to 30 percent of other monomers copolymerized therewith, for example vinyl acetate and other vinyl esters of monocarboxylic acids, ethyl maleate, ethyl fumarate and other alkyl esters of maleic and fumaric acids.

The plasticizers are blended with the vinyl resin in the conventional manner, for example by mixing on a roll mill, a Banbury type mixer or any other suitable mixing device. The plasticizers are used in proportions necessary to achieve the desired plasticity. Although the quantity of plasticizer will depend upon the particular polymer to be plasticized, it is generally found that from 5 to 60 percent of plasticizer will in most cases produce a satisfactory composition for general utility. Such quantity of plasticizer will generally remain as a permanent part of the vinyl resin and the modified vinyl resin so prepared will not deteriorate or become embrittled by reason of the loss of the plasticizer during use.

The value of the plasticizers are estimated by three tests: (1) compatibility, (2) volatility, and (3) Clash-Berg flex temperature. The compatibility is determined by visual inspection, clarity being a requisite in many applications for vinyl chloride polymers. The volatility is estimated by the test of heating at 105° C. for 24 hours and measuring the percentage of the plasticizers evaporated by loss of weight. The Clash-Berg flex temperature is determined by cooling the polymer sample to about −50° C. and observing the change in the modulus of rigidity as the sample warms up to room temperature, the flex temperature being that at which the modulus of rigidity is 135,000 pounds per square inch. Of these tests the compatibility is of primary importance while the others are only critical for certain applications. If the polymer is to be subjected to outside weather conditions flex temperatures of −20 to −30° C. are desirable, otherwise 0° C. is satisfactory. If the polymer is to be subjected to elevated temperatures a volatility of less than ten percent is advantageous, otherwise volatilities as high as 25 percent are often not objectionable. The volatilities and flex temperatures, of polymer plasticizer blends are difficult to predict and often have no apparent relationship to the physical constants of the plasticizer.

The new plasticizers are of general utility in softening vinyl chloride polymers and are effective over a wide range of temperatures. They may be used as the only plasticizing component in a compounded vinyl chloride polymer or they may be used in conjunction with other plasticizers.

Specific examples of the practice of this invention are:

*Example 1*

A solution of 0.45 mole of p-hydroxy biphenyl and 0.45 mole of sodium hydroxide was prepared by dissolving in 200 ml. of ethanol. The solution was added gradually to a solution of 0.6 mole of chloracetic acid and 0.3 mole of sodium carbonate in 120 ml. of water over a period of twenty-seven minutes. The mixture was stirred at room temperature overnight and then heated to 60 to 70° C. for one hour. The solution was then acidified and the solid product which precipitated was identified as p-phenylphenoxyacetic acid.

*Example 2*

The acid prepared in accordance with the preceding example was mixed with a ten percent excess of 2-ethylhexanol and heated in a benzene solution with a small proportion of p-toluenesulfonic acid. The water of reaction was removed from the reaction mixture as the benzene-water azeotrope, from which the water was separated by means of a Dean and Stark trap. The resulting product was identified as the 2-ethylhexyl ester of p-phenylphenoxyacetic acid.

*Example 3*

The procedure of the preceding example was repeated, except that 2-n-butoxy ethyl alcohol was used in place of the 2-ethylhexanol. The product was identified as 2-n-butoxyethyl p-phenylphenoxyacetic acid.

*Example 4*

The procedure of Example 2 was repeated except that 2-ethylhexoxyethyl alcohol was used in place of 2-ethylhexanol. The resulting product was identified as 2-ethylhexoxyethyl p-phenylphenoxyacetic acid.

*Example 5*

The esters prepared in accordance with Examples 2, 3 and 4 were evaluated as plasticizers by milling 40 parts by weight with 60 parts of polyvinyl chloride. The thoroughly milled samples were molded into appropriate test pieces and tested by means of the Clash-Berg flex temperature procedure and their volatility determined by the above described method. The following table sets forth the observed data.

| The Ester of— | Flex Temp. °C. | Volatility Per Cent by Weight |
| --- | --- | --- |
| Example 2 | −18 | 3.47 |
| Example 3 | −15 | 1.73 |
| Example 4 | −16 | 1.30 |

The invention is defined by the following claims.

I claim:

1. A resinous composition of matter, which comprises a polymer of at least 70 percent by weight of vinyl chloride and up to 30 percent of another polymerizable monomer compatible therewith, and a compound having the structural formula:

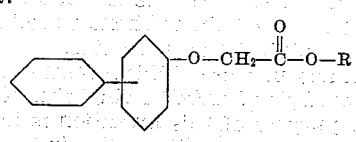

wherein R is an aliphatic radical of the group consisting of hydrocarbon, thiahydrocarbon and oxahydrocarbon radicals having a total of from four to twelve carbon, oxygen and sulfur atoms.

2. A resinous composition, which comprises polyvinyl chloride and from 5 to 60 percent by weight of an alkyl phenylphenoxyacetate, wherein the alkyl group has from four to twelve carbon atoms.

3. A resinous composition which comprises polyvinyl chloride and from 5 to 60 percent by weight of an oxaalkyl phenylphenoxyacetate, wherein the oxaalkyl group has a total of from four to twelve oxygen and carbon atoms.

4. A resinous composition which comprises polyvinyl chloride and from 5 to 60 percent by weight of a thiaalkyl phenylphenoxyacetate, wherein the thiaalkyl group has from four to twelve carbon and sulfur atoms.

5. A resinous composition comprising polyvinyl chloride and from 5 to 60 percent by weight of 2-ethylhexyl p-phenylphenoxyacetate.

6. A resinous composition comprising polyvinyl chloride and from 5 to 60 percent by weight of butoxyethyl p-phenylphenoxyacetate.

7. A resinous composition comprising polyvinyl chloride and from 5 to 60 percent by weight of 2-ethylhexoxyethyl p-phenylphenoxyacetate.

8. A resinous composition of matter, which comprises a polymer of at least 70 per cent by weight of vinyl chloride and up to 30 per cent of another polymerizable monomer compatible therewith, and from 5 to 60 per cent by weight of the polymer of an alkyl phenylphenoxyacetate wherein the alkyl group has from four to twelve carbon atoms.

9. A resinous composition of matter, which comprises a polymer of at least 70 per cent by weight of vinyl chloride and up to 30 per cent of another polymerizable monomer compatible therewith, and from 5 to 60 per cent by weight of the polymer of an oxaalkyl phenylphenoxyacetate wherein the oxaalkyl group has from four to twelve oxygen and carbon atoms.

10. A resinous composition of matter, which comprises a polymer of at least 70 per cent by weight of vinyl chloride and up to 30 per cent of another polymerizable monomer compatible therewith, and from 5 to 60 per cent by weight of the polymer of a thiaalkyl phenylphenoxyacetate wherein the thiaalkyl group has a total of from four to twelve sulfur and carbon atoms.

JOACHIM DAZZI.

REFERENCES CITED

The following references are of record in the file of this patent:

UNITED STATES PATENTS

| Number | Name | Date |
| --- | --- | --- |
| 2,170,995 | Grether et al. | Aug. 29, 1939 |
| 2,170,996 | Grether et al. | Aug. 29, 1939 |
| 2,369,985 | Safford | Feb. 20, 1945 |
| 2,393,495 | Tann | Jan. 22, 1946 |
| 2,396,513 | Jones | Mar. 12, 1946 |
| 2,428,978 | Martin et al. | Oct. 14, 1947 |
| 2,451,085 | Hester | Oct. 12, 1948 |
| 2,482,706 | Day | Sept. 20, 1949 |

OTHER REFERENCES

Ser. No. 367,292, Berg et al. (A. P. C.), published Apr. 20, 1943.